United States Patent [19]
Babaian et al.

[11] Patent Number: 5,794,029
[45] Date of Patent: Aug. 11, 1998

[54] ARCHITECTURAL SUPPORT FOR EXECUTION CONTROL OF PROLOGUE AND EPLOGUE PERIODS OF LOOPS IN A VLIW PROCESSOR

[75] Inventors: Boris A. Babaian; Valeri G. Gorokhov; Feodor A. Gruzdov; Yuli Kh. Sakhin; Vladimir Yu. Volkonski, all of Moscow, Russian Federation

[73] Assignee: Elbrus International Ltd., Cayman Islands

[21] Appl. No.: 733,480

[22] Filed: Oct. 18, 1996

Related U.S. Application Data

[63] Continuation of PCT/RU96/00213 Aug. 7, 1996.
[51] Int. Cl.$^6$ .................................................... G06F 9/445
[52] U.S. Cl. ............................................ 395/588; 395/709
[58] Field of Search .................................... 395/709, 588

[56] References Cited

U.S. PATENT DOCUMENTS

| | | | |
|---|---|---|---|
| 4,236,227 | 11/1980 | Bull et al. | 365/49 |
| 4,782,444 | 11/1988 | Munshi et al. | |
| 5,036,454 | 7/1991 | Rau et al. | |
| 5,083,267 | 1/1992 | Rau et al. | |
| 5,210,827 | 5/1993 | Takahashi et al. | |
| 5,226,128 | 7/1993 | Rau et al. | |
| 5,303,352 | 4/1994 | Inoue et al. | 395/709 |
| 5,386,562 | 1/1995 | Jain et al. | 395/709 |
| 5,471,189 | 11/1995 | Dietz et al. | 340/146.2 |
| 5,530,665 | 6/1996 | Yoneda | 365/49 |

FOREIGN PATENT DOCUMENTS

| | | |
|---|---|---|
| A2 0293851 | 12/1988 | European Pat. Off. |
| A2 0298523 | 1/1989 | European Pat. Off. |
| A 525956 | 12/1976 | U.S.S.R. |
| A1 742942 | 6/1980 | U.S.S.R. |
| A 1447297 | 8/1979 | United Kingdom |

OTHER PUBLICATIONS

Linley Gwennap, *VLIW: The Wave of the Future? Processor Design Style Could Be Faster, Cheaper Than RISC,* Feb. 14, 1994, pp. 18–21.

Vinod Kathail, Michael Schlansker, and B. Ramakrishna Rau, *HPL PlayDoh Architecture Specification: Version 1.0,* Feb. 1994, pp. 1–48.

Gary R. Beck and David W.L. Yen, *The Cydra 5 Minisupercomputer: Architecture and Implementation,* 1993, pp. 143–180.

James C. Dehnert and Ross A. Towle, *Compiling for the Cydra 5,* 1993, 181–227.

James C. Dehnert, Peter Y.-T. Hsu, and Joseph P. Bratt, *Overlapped Loop Support in the Cydra 5,* 1989, pp. 26–38.

*Primary Examiner*—Krisna Lim
*Attorney, Agent, or Firm*—Pennie & Edmonds LLP

[57] ABSTRACT

For certain classes of software pipelined loops, prologue and epilogue control is provided by loop control structures, rather than by predicated execution features of a VLIW architecture. For loops compatible with two simple constraints, code elements are not required for disabling garbage operations during prologue and epilogue loop periods. As a result, resources associated with implementation of the powerful architectural feature of predicated execution need not be squandered to service loop control. In particular, neither increased instruction width nor an increased number of instructions in the loop body is necessary to provide loop control in accordance with the present invention. Fewer service functions are required in the body of a loop. As a result, loop body code can be more efficiently scheduled by a compiler and, in some cases, fewer instructions will be required, resulting in improved loop performance. Loop control logic includes a loop control registers having an epilogue counter field, a shift register, a side-effects enabled flag, a current loop counter field, a loop mode flag, and side-effects manual control and loads manual control flags. Side-effects enabling logic and load enabling logic respectively issue a side-effects enabled predicate and a loads enabled predicate to respective subsets of execution units. Software pipelined simple and inner loops are supported.

19 Claims, 4 Drawing Sheets

ARCHITECTURAL SUPPORT FOR EXECUTION CONTROL OF PROLOGUE AND EPLOGUE PERIODS OF LOOPS IN A VLIW PROCESSOR

The present application claims priority under 35 U.S.C. §120 of the co-pending a PCT international application designating the United States of America (serial. no. PCT/RU96/00213) filed Aug. 7, 1996, naming Babaian et al. as inventors and entitled "ARCHITECTURAL SUPPORT FOR SOFTWARE PIPELINING OF LOOPS".

RELATED APPLICATIONS

The present invention is related to subject matter disclosed in the following co-pending U.S. patent application Ser. Nos.: 08/733,479 ("Architectural Support for Software Pipelining of Nested Loops"); 08/733,832 ("Wide Instruction Unpack"); 08/733,834 ("Multifunctional Execution Unit, Executing Combined Operations and Supporting Continuing Instruction Flow"); and 08/733,831 ("Array Prefetch Algorithm"); each filed on even date herewith and each incorporated herein by reference, in its entirety.

BACKGROUND OF THE INVENTION

1. Field of the Invention

The present invention relates to processor architectures, and more particularly to processor architectures amenable to software pipelining techniques.

2. Description of the Related Art

Very Long Instruction Word (VLIW) processor architectures represent a design approach for exploiting instruction level parallelism in which the bulk of instruction scheduling and parallel dispatch is relegated to a compiler. In some ways, VLIW is a natural successor to RISC, furthering a trend toward moving complexity from the hardware to a compiler so as to enable simpler, faster processors. See Gwennap, VLIW: The Wave of the Future, *Microprocessor Report*, Feb. 14, 1994, pp. 18–21 (discussing VLIW architectures). A VLIW processor design eliminates the need for complex instruction scheduling logic on the chip by shifting scheduling responsibilities to the compiler. Parallelism is determined explicitly by a compiler at a program code level. The compiler generates code which is suitable for parallel execution at multiple execution units and which allows for data and resource dependencies. When data dependencies are dynamic, they are explicitly mapped in the compiled code.

Such compiled code is organized as VLIW instructions encoding a number of independent operations that can be executed by execution units of the VLIW processor, in parallel. A typical VLIW instruction horizontally encodes multiple operations as a single, very long instruction; hence the name. These operations can flow directly to associated functional units with a minimum of decoding. NOPs are provided to functional units and a pure VLIW processor has no hardware scheduling interlocks, relying instead on the compiler for scheduling and dependency handling.

Figure 1:
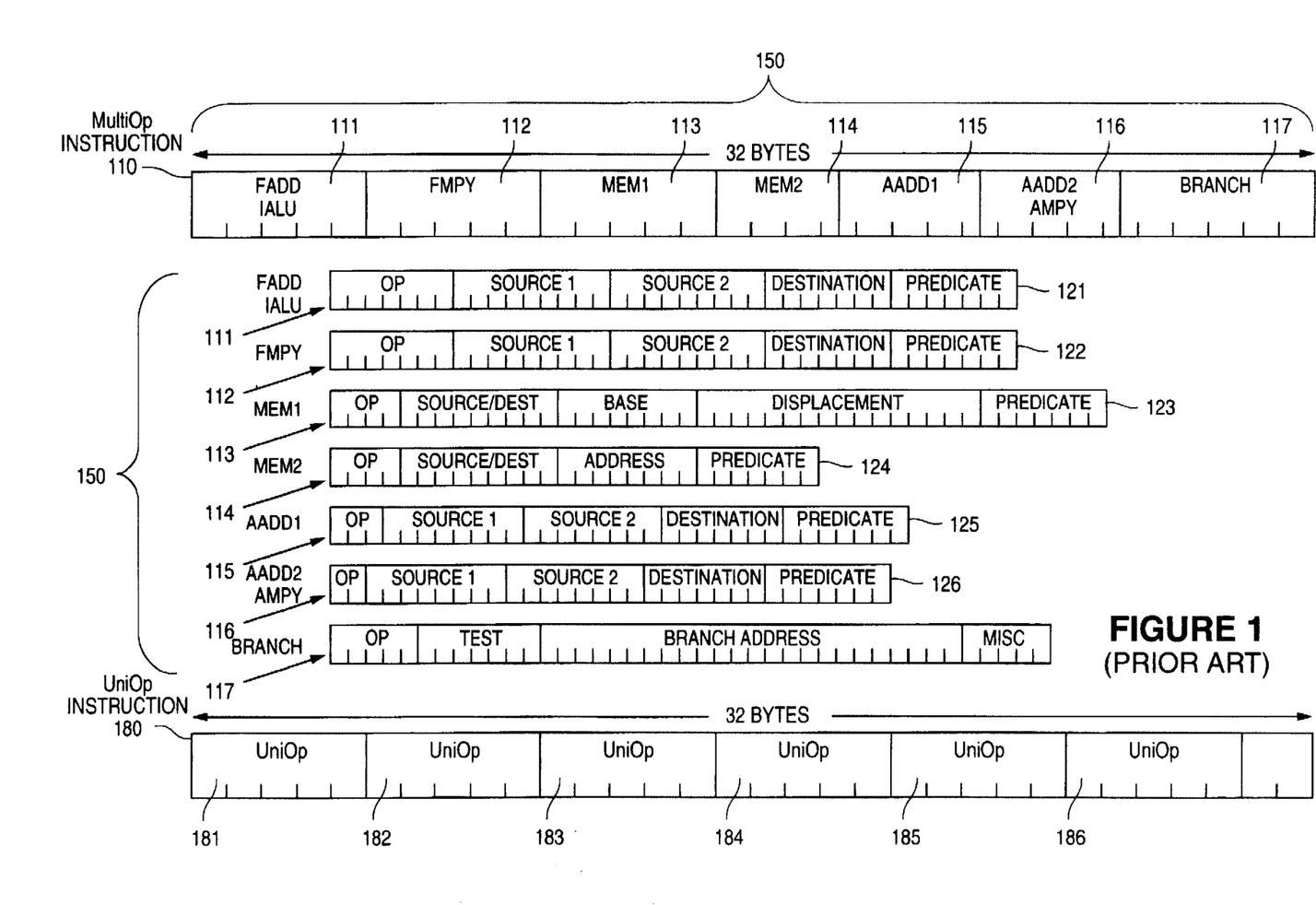
FIG. 1 is a pictorial illustration of the VLIW instruction format of the Cydra 5 processor architecture.

The Cydra 5 was an early VLIW implementation. See generally, Beck et al., The Cydra 5 Minisupercomputer: Architecture and Implementation. *Journal of Supercomputing*, 7, 143–180 (1993) (providing a retrospective on the Cydra 5 architecture). The Cydra 5 was capable of initiating one instruction every clock cycle at each of six functional units. The Cydra 5 supported two instruction formats: MultiOp and UniOp, as shown in FIG. 1. A MultiOp instruction, e.g., MultiOp instruction 110, included seven "containers," one for each of six functional units (e.g., containers 111, 112, 113, 114, 115, and 116) and a seventh (e.g., container 117) for instruction sequencing control. Each of the containers (shown collectively as containers 150) provided storage for an operation encoded in a format similar to that of a conventional load-store RISC instruction. However, in addition, containers 111, 112, 113, 114, 115, and 116 included respective predicate specifiers 121, 122, 123, 124, 125, and 126.

The effectiveness of the MultiOp format was highly dependent on the program, and on how effectively the compiler could extract operations for parallel execution. In particular, performance and capacity of the instruction cache was adversely affected if there was little inherent parallelism to encode, i.e., if the containers of a MultiOp instruction encoded mainly null operations (or NOOPs). The UniOp format, as exemplified by UniOp instruction 180, was provided for such cases and included six containers 181, 182, 183, 184, 185, and 186 for encoding operations (six per UniOp instruction). During each cycle, a single operation from a UniOp instruction was decoded and supplied to a single one of the seven units (i.e., to one of six functional units or to the instruction unit) and NOOPs were supplied to the remaining six units. Successive operations of the UniOp instruction were decoded and supplied during successive cycles. Functional units of the Cydra 5 had the same behavior whether an operation was supplied from a MultiOp instruction or from a UniOp instruction, although, in the case of an operation supplied from a UniOp instruction, the associated (unencoded) predicate was forced to true. A given instruction stream included of arbitrary mixes of MultiOp and UniOp instructions.

A major objective of the Cydra 5 architecture was to allow the overlapping of loop iterations without requiring multiple copies of the loop body or complex compensation code. See generally, Dehert et al., Overlapped Loop Support in the Cydra 5, *Proc. 2nd Internat. Conf on Architectural Support for Programming Languages and Operating Systems* (Boston, Mass., Apr. 3–6, 1989), pp. 26–38. The approach taken by the Cydra 5 was to execute a compiled, overlapped loop schedule of TL cycles, organized as Stage Count (SC) stages where:

$$SC = TL/II$$

and where II is an iteration interval. As the execution of the loop progressed, during the first II cycles, the first stage of iteration 1 executed. During the next II cycles, the first stage of iteration 2 and the second stage of iteration 1 executed, and so on until SC different iterations were executing in different stages. In Cydra 5 terminology, the first SC-1 iterations of a loop, i.e., when not all stages were yet executing, was collectively known as the prologue. During the final SC iterations, the opposite process occurred until the last stage of the last iteration was executed. In Cydra 5 terminology, the final SC-1 iterations of a loop, i.e., when all stages were again not executing, was collectively known as the epilogue. The remaining iterations, i.e., when all stages were executing concurrently, were known as the kernel.

The loop scheduling model described above presented the Cydra 5 with several significant implementation issues, including the following:

1. To have all stages of a loop executing in parallel, while representing the entire loop schedule as a single folded schedule of II cycles, a mechanism for controlling the execution of initial and final iterations when not all stages were executing (i.e., during the prologue and epilogue) was necessary; and 2. Since an iteration of the loop schedule included disjoint portions from SC different stages, conditional branches around code to be skipped were inadequate and an alternate mechanism for handing of conditional code in loop bodies was necessary.

The Cydra 5 provided a single mechanism to deal with prologue and epilogue control and with conditional code in loop bodies. The mechanism was based on a file of single-bit Iteration Control Registers (ICRs). In addition, the Cydra 5 mechanism relied on a loop counter (LC) register, which kept track of the number of prologue and kernel iterations yet to be executed, an epilogue stage counter (ESC), and a BRanch to TOP of loop (brtop) operation which specified the first instruction of the loop body as its branch target address.

To exploit the Cydra 5 mechanism for prologue and epilogue control, ICR0 was set before loop entry and all other ICRs were cleared. On each successive iteration, an Iteration Control Pointer (ICP) into the ICR file was decremented, effectively shifting the ICR file. The brtop operation set a new logical ICR0 until LC reached zero. Thereafter, the logical ICR0 was cleared during each iteration until the ESC reached zero, indicating the end of the loop body. The compiler made first stage operations conditional on ICR0, second stage operations conditional on ICR1, etc. In this way, only first stage operations executed during the first iteration through the loop, only the first two stages executed during the second iteration, etc. At the end of the kernel, i.e., when LC reached zero, ICR0 was set to zero and first stage operations no longer executed. On each successive iteration, one less stage executed until the ESC reached zero and the loop was complete.

A number of elements of the ICR file equal to the stage count (SC) were used to provide prologue/epilogue control. Conditional code (including conditional code in the loop body) was handled similarly, using additional elements of the ICR file. See supra, Dehert et al., Overlapped Loop Support in the Cydra 5, for a more detailed description of Cydra 5 loop control, conditional execution, and brtop operation semantics.

SUMMARY OF THE INVENTION

It has been discovered that for certain classes of loops, prologue and epilogue control can be provided by hardware structures, rather than by predicated execution features of a processor architecture. For loops compatible with two simple constraints, the present invention advantageously does not require additional code elements for disabling garbage operations during prologue and epilogue loop periods. Resources associated with implementation of the powerful architectural feature of predicated execution need not be squandered to service loop control. In particular, neither increased instruction width nor an increased number of instructions in the loop body is necessary to provide loop control in accordance with the present invention. Fewer service functions are required in the loop body. As a result, loop body code can be more efficiently scheduled by a compiler and, in some cases, fewer instructions will be required, resulting in improved loop performance.

In an embodiment of the present invention, an apparatus includes a prologue distinguishing register complex, an epilogue distinguishing register, side-effects enabling logic, and loads enabling logic. The prologue distinguishing register complex is responsive to physical iterations of loop body code and the state of the prologue distinguishing register complex advances toward an end of prologue state in correspondence with the physical iterations of the loop body code. The epilogue distinguishing register is also responsive to the physical iterations of the loop body code and the state of the epilogue distinguishing register advances toward a beginning of epilogue state in correspondence with the physical iterations of the loop body code. The side-effects enabling logic is coupled to the prologue distinguishing register complex and is responsive to the state thereof. The side-effects enabling logic supplies a side-effects enabled predicate except during a prologue period of the loop body. The loads enabling logic is coupled to the epilogue distinguishing register and is responsive to the state thereof. The loads enabling logic supplies a loads enabled predicate except during an epilogue period of the loop body.

In another embodiment of the present invention, a method of controlling execution of software pipelined loop body code includes initializing a prologue distinguishing register complex with an indication corresponding to a number of overlapped logical iterations minus one (NOVL−1) in the loop body code; initializing an epilogue distinguishing register with an indication corresponding to a number of logical iterations in the loop body code; advancing the state of the prologue distinguishing register complex toward an end of prologue state in correspondence with physical iterations of the loop body code; and advancing the state of the epilogue distinguishing register toward a beginning of epilogue state in correspondence with physical iterations of the loop body code. The method further includes supplying, after the prologue distinguishing register complex reaches the end of prologue state, a side-effects enabled predicate to a first execution unit providing execution support for operations of the loop body code that cause side-effects; and supplying, until the epilogue distinguishing register reaches the beginning of epilogue state, a loads enabled predicate to a second execution unit providing execution support for load operations of the loop body code.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE PREFERRED EMBODIMENTS

Although predicated operation execution, such as that used in the Cydra 5 processor architecture, is a viable approach for solving the problem of partial code execution during prologue and epilogue periods in the execution of software pipelined loops, two disadvantages of the approach are notable. First, because the Cydra 5 approach requires that all operations in a loop body be predicated, the volume of loop body code is increased due to predicated execution encodings. Second, predicated execution is a powerful architectural feature whose exploitation is complicated by its use for loop control. Regarding loop body code volume, such an increase is not typically critical for computers which sequentially evaluate individual instructions. In such computers, increased code volume typically affects only memory bandwidth requirements and instruction cache miss ratios. However, the performance of a VLIW processor architecture is more critically affected because of the limited length of a VLIW instruction encoding. In particular, the use of predicated execution encodings to support prologue and epilogue loop control may transform an n-cycle loop, i.e., a loop body of n VLIW instructions, into an n+1 cycle loop.

The particular effect of encoding additional predicate specifiers for loop control depends on the particular approach employed for predicate encoding in a particular processor architecture. For example, the predicated execution encoding approach employed by the processor architecture described herein uses a VLIW instruction constructed from an arbitrary (but limited) number of syllables of various types including header, arithmetic/logical, conditional, control, loop, and literal syllables. The first syllable—the header syllable—encodes the structure and length of the instruction. In general, one arithmetic or logical syllable encodes an operation for an execution channel; however, this operation encoding does not include the predicate specifier. Predicates (if needed) are encoded in separate syllables. The loop body code length impact of predicated execution encodings to support prologue and epilogue loop control can be illustrated in the context of scheduling a hypothetical loop. As a baseline, if the loop is first scheduled without encoded loop control predicates, it will often be possible to obtain very efficient code of n very long instructions which utilize most of the hardware resources provided by the processor architecture. Now, if predicated execution encodings must be added to provide loop control, additional predicate syllables will be required. Since the very long instruction length is limited, it will often be the case that there is no room for the predicate syllables and a single very long instruction must be broken into two. If the loop body where efficiently encoded without loop predicates using n=1 very long instructions, n+1 very long instructions would represent a doubling of loop body iterations.

In the Cydra 5, where operation encodings always include a predicate specifier (recall FIG. 1) in a fixed length very long instruction, the effect is not so much an incremental increase in loop body code volume as it is an inefficient method for utilizing instruction space (i.e., very long instruction length) in cases where predicated execution is not used. However, in either case, i.e., in either variable or fixed length very long instruction architectures, the net effect of predicated execution encodings for loop control is less efficient use of very long instruction words.

Predicated execution is a powerful architectural feature which can be used to transform control flow dependencies into data flow dependencies by executing both limbs of a branch. The technique is known as IF conversion and allows a pipelined processor to include a large class of loops with branches in its pipelining implementation. See generally supra, Dehert et al., Overlapped Loop Support in the Cydra 5. Unfortunately, the additional overhead of predicated operation encoding for prologue and epilogue loop control impedes the efficient utilization of the IF conversion technique. For example, consider a loop with a branch which is pipelined and for which the alternate limbs of the branch are represented as IF converted operations, i.e., as two groups of operations, one predicated by the branch taken condition and the other predicated by the branch not taken condition. Because the loop is software pipelined, all operations in the loop will need to be predicated to support predicated execution based loop control. However, the IF converted loop body code must also be predicated. Extra operations must be inserted in the loop body to combine these two predicates (i.e., the predicated execution predicates for loop control and the IF conversion predicates) into one. Such extra operations may transform an n instruction loop body into an n+1 instruction loop body.

In contrast, a processor in accordance with the present invention provides, for certain classes of loops, prologue and epilogue control using loop control structures, rather than with predicated execution features of a pipeline architecture. For loops compatible with two simple constraints, code elements are not required for disabling operations during prologue and epilogue loop periods. As a result, resources associated with implementation of the powerful architectural feature of predicated execution need not be squandered to service loop control. In particular, neither increased instruction width nor an increased number of instructions in the loop body is necessary to provide loop control accordance with the present invention. Fewer service functions are required in the body of a loop. As a result, loop body code can be more efficiently scheduled by a compiler and, in some cases, fewer instructions will be required, resulting in improved loop performance.

Figure 2:
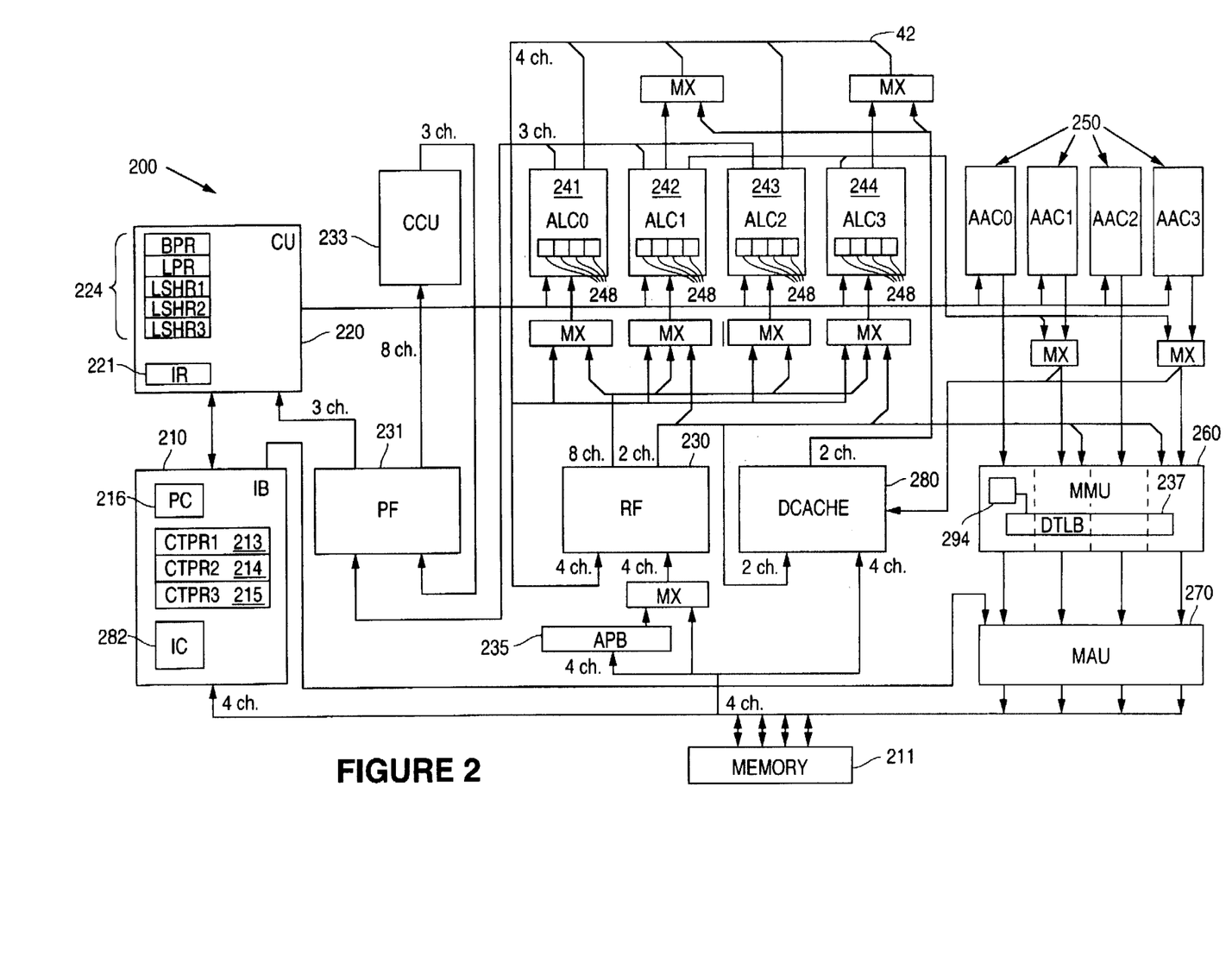
FIG. 2 is a system block diagram for a VLIW processor constructed in accordance with the teachings of the present invention.

FIG. 2 depicts the architecture of a Very Long Instruction Word (VLIW) processor 200 in accordance with an exemplary VLIW embodiment of the present invention. VLIW processor 200 includes an instruction buffer (IB) 210, a control unit (CU) 220, a multiport register file (RF) 230, 4 arithmetic logic channels (ALC0 241, ALC1 242, ALC2 243, and ALC3 244), each of which includes multiple execution units (EUs) 248, array access channels (AAC0, AAC1, AAC2, and AAC3) 250, a memory management unit (MMU) 260, a memory access unit (MAU) 270, an array prefetch buffer (APB) 235, and a data cache (DCACHE) 280.

VLIW processor 200 has a long instruction word architecture and exploits Instruction Level Parallelism (ILP) among operations of a long instruction word. A compiler is used to schedule operations to be executed by VLIW processor 200 during each cycle. The design of VLIW processor 200 allows concurrent execution of multiple independent operations (e.g., load, store, add, multiply, divide, shift, logical, and branch operations) that make up a long instruction. Long instructions are stored in a memory 211 and an instruction cache (IC) 282 of VLIW processor 200 in packed form.

Instruction buffer 210 fetches long instructions from memory 211, or from an included instruction cache (IC) 282 if cached. Instruction buffer 210 includes instruction cache (IC) 282, instruction alignment logic, a program counter register (PC) 216, and control transfer preparation registers (CTPR1 213, CTPR2 214, and CTPR3 215). Instruction cache (IC) 282 is filled in response to both linear program path pre-fetches and control transfer preparation operations.

Control Unit (CU) 220 issues wide instruction operations for execution and performs several tasks including:

1. reading operands from the register file (RF) 230 for provision to arithmetic logic channels (ALC0 241, ALC1 242, ALC2 243, and ALC3 244);
2. reading predicate values from predicate file (PF) 231 as condition codes for Control Transfer Operations (CTOPs);

3. reading predicate values from the predicate file (PF) 231 for provision to the calculate condition unit (CCU) 233 for calculation of new predicate values and generation of a condition execution mask for operations in execution units (EUs) 248 of arithmetic logic channels (ALC0 241, ALC1 242, ALC2 243, and ALC3 244) and for operations in array access channels (AAC0, AAC1, AAC2, and AAC3) 250;

4. issuing literal values to arithmetic logic channels (ALC0 241, ALC1 242, ALC2 243, and ALC3 244) and array access channels (AAC0, AAC1, AAC2, and AAC3) 250;

5. issuing operations to arithmetic logic channels (ALC0 241, ALC1 242, ALC2 243, and ALC3 244);

6. issuing operations to array access channels (AAC0, AAC1, AAC2, and AAC3) 250; and 7. issuing operations to calculate condition unit (CCU) 233.

Control unit (CU) 120 also executes Control Transfer Operations (CTOPs) and includes storage, collectively shown as special registers 224, which includes:

1. loop parameter and status registers (e.g., LPR, LSHR1, LSHR2, and LSHR3) used for loop control, and 2. base registers (BP) to address into predicate file 231 for control transfers and predicated execution modes.

Both the loop parameter and status registers and the base registers are software accessible for read and write.

Overlapped Loop Organization and Constraints

To compile loop code for overlapped execution, a compiler overlaps portions of the loop code corresponding to several subsequent iterations of the loop. Operations from the several iterations are represented, or overlapped, in a single stage. Designs for compilers providing overlapped iteration code are well known to persons of ordinary skill the art. See e.g., Dehnert et al., Compiling for the Cydra 5, *Journal of Supercomputing*, 7, 181–227 (1993). Such compilers implement variations on a technique known as software pipelining.

Two types of iterations should be distinguished. In particular, logical iterations of the initial loop code (i.e., iterations as represented in the loop code before compiling) contrast with the physical iterations of a software pipelined loop. Multiple logical iterations are overlapped in a given physical iteration. In overlapped loop code, where the number of overlapped logical iterations in a given physical iteration is NOVL. NOVL physical iterations must be executed to complete a logical iteration. In other words, each logical iteration is executed in NOVL stages. If the initial loop code has NLI logical iterations, then the overlapped, pipelined loop should have NPI physical iterations where:

NPI=NLI+(NOVL—1).

Figure 3:
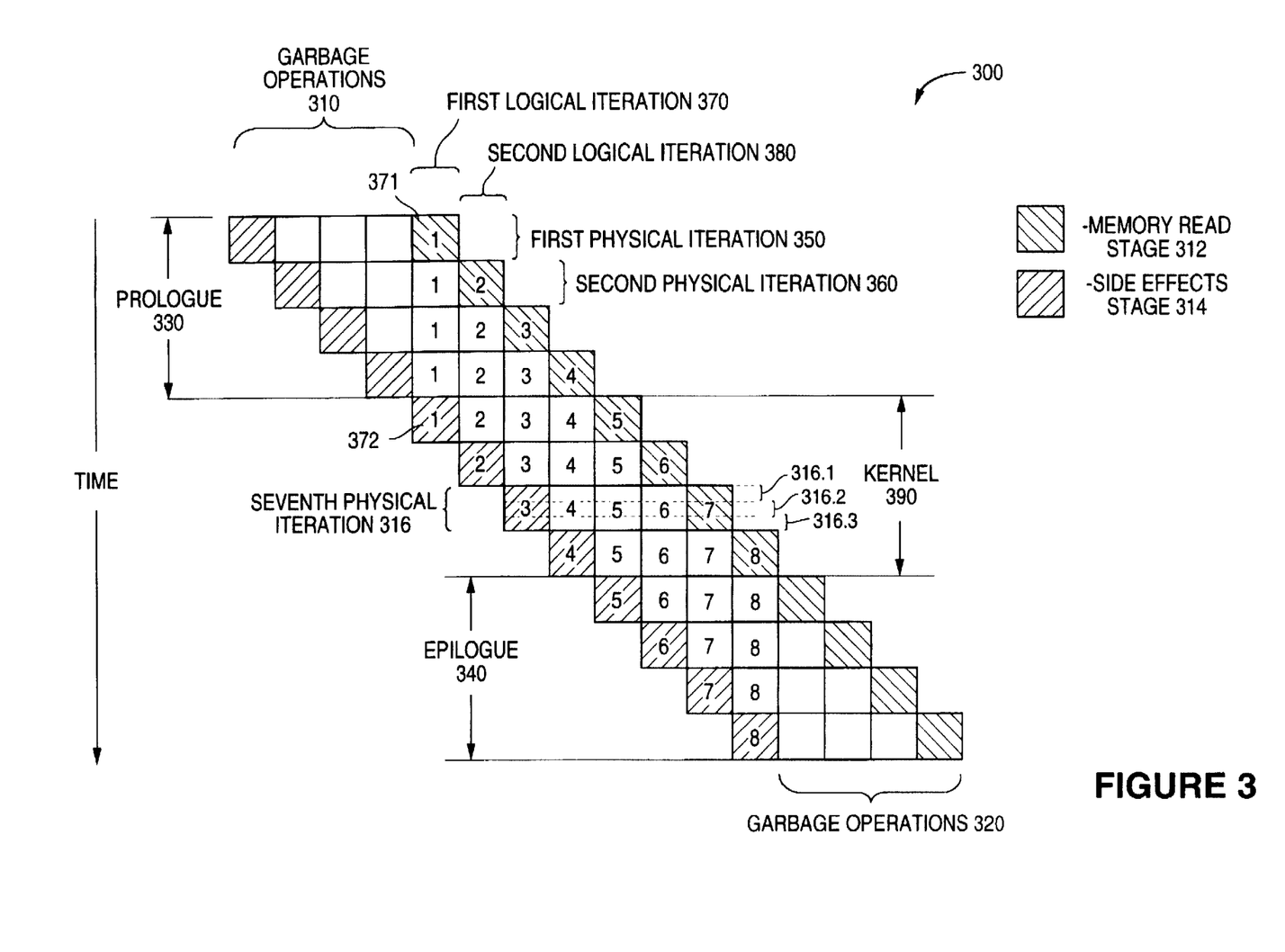
FIG. 3 is a pictorial illustration of loop scheduling in accordance with the teachings of the present invention.

FIG. 3 depicts a loop schedule 300 including iterations of loop body code compiled for execution on VLIW processor 200. Loop schedule 300 is illustrative of a simple loop, i.e., single level, unnested loop, and also illustrative of an inner loop, i.e., a innermost loop nested within one or more levels of outer loops. Logical iterations (e.g., first logical iteration 370 and second logical iteration 380) and physical iterations (e.g., first physical iteration 350 and second physical iteration 360) are both illustrated in FIG. 3. Five logical iterations are overlapped in each physical iteration and each logical iteration is executed in five stages.

During execution of a kernel portion 390 of the loop body, operations from respective stages of five logical iterations are executed at execution units of VLIW processor 200. For example, during the seventh physical iteration 316, stages of logical iterations 3, 4, 5, 6, and 7 are executed. A single physical iteration can require the evaluation of more than one long instruction word, i.e., "n" long instruction words evaluated in "n" cycles such as 316.1, 316.2, and 316.3. However, not every very long instruction required for a physical iteration will contribute an operation to the set of operations evaluated for a stage of a logical iteration, i.e., some cycles will not contribute an operation to some stages. Unlike the physical iterations of kernel portion 390, physical iterations of prologue 330 and epilogue 340 portions of the loop body do not include a full set of stages. In particular, during prologue portion 330 (i.e., during the first NOVL–1 physical iterations of loop body 300) certain stages include garbage operations 310 which are associated with non-existent logical iterations. Similarly, during epilogue portion 340 (i.e., during the last NOVL–1 physical iterations of loop body 300) garbage operations 320 are associated with other non-existent logical iterations.

In each case, these garbage operations (310 and 320) arise because each physical iteration of loop body 300 includes the same set of operations, encoded by the one or more VLIW instruction cycles which make up a physical iteration.

However, despite the full set of operations encoded for a physical iteration of loop body code, only one valid stage exists in the first physical iteration 350, only two valid stages exist in the second physical iteration 360, etc., until all five stages are valid in the initial physical iteration of kernel portion 390 (i.e., physical iteration NOVL). Garbage operations 310 are the invalid operations. Garbage operations 320 are similar, but result from increasing numbers of stages containing invalid operations during the epilogue portion 340 of loop body 300.

Unlike the Cydra 5 which provided prologue/epilogue control by exploiting predicated execution codings to successively enable additional stages during successive physical iterations of the prologue and to successively disable stages during successive physical iterations of the epilogue, the prologue/epilogue control technique implemented by control logic 220 of VLIW processor 200 selectively enables and disables the execution of categories of operations. Although the prologue/epilogue control technique is not a general solution for all simple or inner loop body code, the technique can be applied to a large class of loop programs. In addition, the technique and its implementation are compatible with additional architectural support for nested loops as described in (a) a co-pending patent application entitled "Architectural Support for Software Pipelining of Nested Loops," Ser. No. 08/733,479, naming Babaian et al. as inventors and filed on even date herewith, and (b) the corresponding PCT international application designating the United States of America (Ser. No. PCT/RU96/00216), the detailed descriptions of which are incorporated herein by reference. The technique and its implementation are also compatible with additional architectural support for prefetching array data as described in (a) a co-pending United States patent application entitled "Array Prefetch Algorithm," Ser. No. 08/733,831, naming Babaian et al. as inventors and filed on even date herewith, and (b) the corresponding PCT international application designating the United States of America (Ser. No. PCT/RU96/00217), the detailed descriptions of which are incorporated herein by reference.

Prologue/epilogue control in accordance with the present invention requires that loop body code conform to two reasonable constraints on the structure of the pipelined logical iterations. In particular, the constraints are as follows:

memory read operations (e.g., loads) must be located in the first stage of a logical iteration; and operations with side-effects (e.g., memory write operations or stores, loop breaks, etc.) must be located in the last stage of a logical iteration.

Suitable compiler techniques to provide loop body code in accordance with these constraints are well known to those of ordinary skill in the art and loop body code 300 is compiled using any such suitable techniques. Referring to FIG. 3, the restriction of memory read operations to memory read stages 312 and of operations having side-effects to side-effects stages 314 is illustrative of loop body code structured in accordance with the above constraints. In particular, memory read operations associated with logical iteration 370 are constrained to the first stage 371 of the logical iteration. Similarly, side-effects operations associated with logical iteration 370 are constrained to the last stage 372 of the logical iteration.

Although not every loop can be structured in accordance with these constraints, the constraints are not as dramatic as they might appear. An overwhelming majority of loops in known benchmarks are compatible them and can advantageously exploit the specialized loop control logic described below. If, on the other hand, a particular loop body cannot be structured in accordance with the above constraints, the hardware support provided by the specialized loop control logic can be selectively disabled in favor of the Cydra 5 approach in which the compiler takes on responsibility for providing predicated execution encodings to maintain prologue/epilogue control.

Loop Control Implementation

Figure 4:
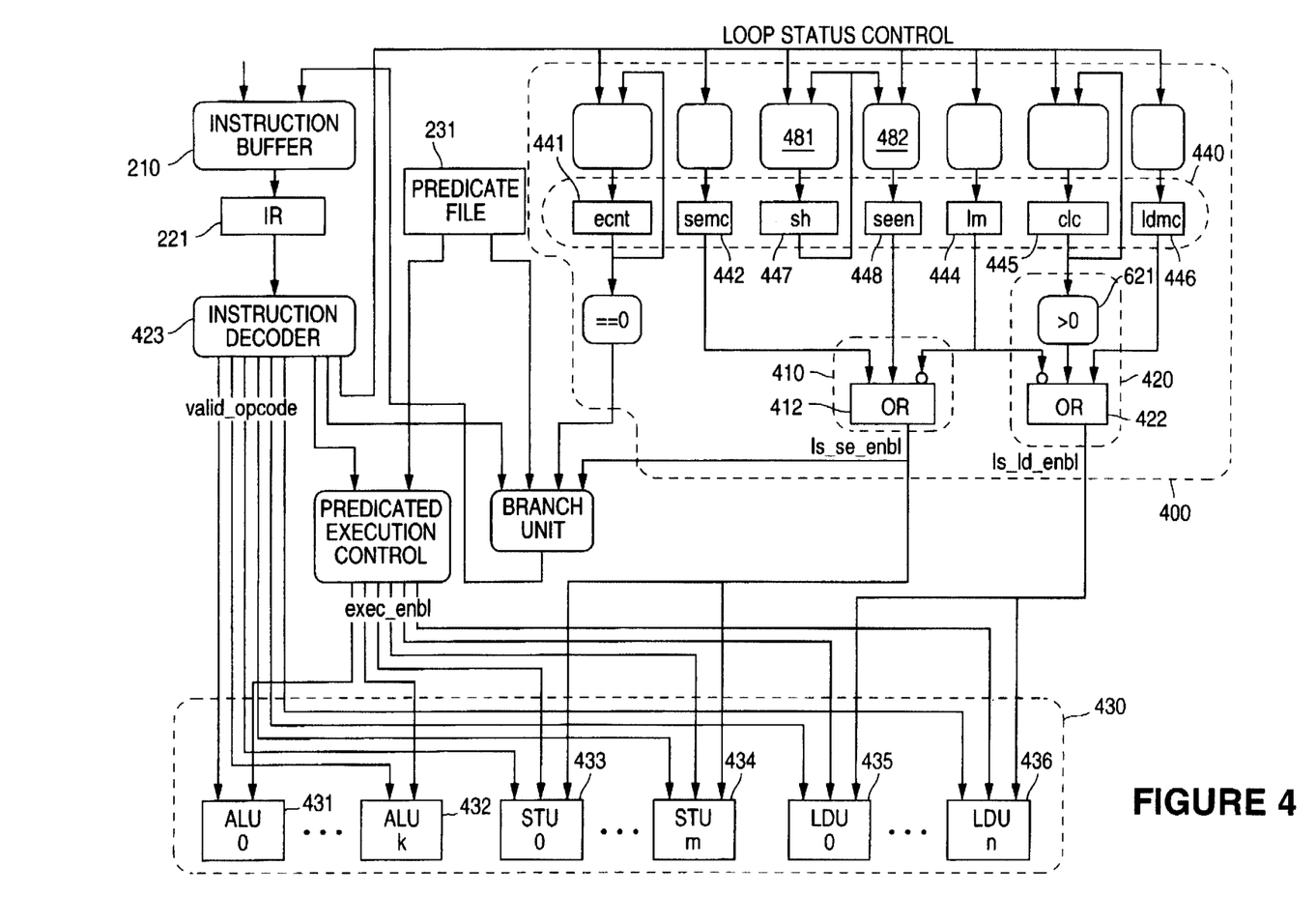
FIG. 4 is a block diagram of loop control logic constructed in accordance with the teachings of the present invention.

FIG. 4 depicts loop control logic 400 of VLIW processor 200 which provide prologue and epilogue control. Loop control logic 400 is coupled to receive values for loop control variables from instruction decoder 423. These values are used to initialize fields of various loop parameters and loop control registers (collectively shown as loop parameter and status registers 440). In particular, these values initialize an epilogue counter field (ecnt) 441, a shift register (sh) 447, a side-effects enabled flag (seen) 448, a current loop counter field (clc) 445, a loop mode flag (lm) 444, and side-effects manual control (semc) and loads manual control (ldmc) flags (442 and 446). Side-effects enabling logic 410 and load enabling logic 420 respectively issue the side-effects enabled predicate (ls_se_enbl) and the loads enabled predicate (ls_ld_enbl) to respective subsets of execution units illustratively grouped as 430.

STU$_0$ 433 through STU$_m$ 434 are illustrative of a first group of execution units 248 which implement operations with side-effects and which are distributed among ALC1 242 and ALC3 244 as described above with reference to FIG. 2. STU$_0$ 433 through STU$_m$ 434 are also illustrative of the AAU1 and AA3 channels of AAU 250. STU$_0$ 433 through STU$_m$ 434 are each responsive to the ls_se_enbl predicate, enabling side-effects operations when ls_se_enbl is asserted and disabling side-effects operations when ls_se_enbl is de-asserted.

LDU$_0$ 435 through LDU$_n$ 436 are similarly illustrative of a second group of execution units 248 which implement load operations and which are distributed among ALC1 242 and ALC3 244 as described above with reference to FIG. 2. LDU$_0$ 435 through LDU$_n$ 436 are also illustrative of array access channels (AAC0, AAC1, AAC2, and AAC3) 250. LDU$_0$ 435 through LDU$_n$ 436 are each responsive to the ls_ld_enbl predicate, enabling load operations when ls_ld_enbl is asserted and disabling side-effects operations when ls_ld_enbi is de-asserted. Array access channels (AAC0, AAC1, AAC2, and AAC3) 250 are also described in (a) the copending United States patent application entitled "Array Prefetch Algorithm," Ser. No. 08/733,831, naming Babaian et al. as inventors and filed on even date herewith, and (b) the corresponding PCT international application designating the United States of America (Ser. No. PCT/RU96/00217), the detailed descriptions of which are incorporated herein by reference.

ALU$_0$ 431 through ALU$_k$ 432 are illustrative of a third group of execution units 248 which implement arithmetic and logic operations (i.e., non-load and nonside-effects operations) and which are distributed among ALC0 241, ALC1 242, ALC2 243, and ALC3 244 as described above with reference to FIG. 2. The operation of ALU$_0$ 431 through ALU$_k$ 432 is unaffected by the state of either the ls_se_enbl predicate or the ls_ld_enbl predicate.

Side-effects enabling logic 410 and load enabling logic 420 are depicted functionally in FIG. 4. Side-effects enabling logic 410 implements the following predicate:

ls_se_enbl=!lm ||seen ||semc;

while load enabling logic 420 implements:

ls_ld_enbl =!lm ||(clc >0) ||ldmc;

Those of ordinary skill in the art will recognize a variety of alternative implementations for the functionality of side-effects enabling logic 410 and load enabling logic 420. For example, although the embodiment of FIG. 4 is shown with comparison logic (e.g., less than zero comparison logic 421) and OR gates (e.g., OR gates 412 and 422), side-effects enabling logic 410 and load enabling logic 420 may be implemented in positive or negative logic, using AND, OR, NAND, or NOR gates, etc. Suitable transformations of the respective logic equations will be appreciated by those of ordinary skill in the art. Additionally, the initialization and transition sequencing of register fields may be alternately defined with suitable modifications to the logic equations. Similarly, many suitable designs for comparing register values to trigger values will be appreciated by those of ordinary skill in the art. Side-effects enabling logic 410 and load enabling logic 420 are of any such suitable designs.

The operation of loop control logic 400 is now described in the context of three types of operations and with reference to FIGS. 3 and 4. These operation types are:

a) operations that cause side-effects (stores, loop breaks, etc.), b) load operations (including load address modifications), and c) arithmetic/logic type operations.

For loop body code compiled in accordance with the constraints described above, operations with side-effects are restricted to the last stage of a logical iteration and load operations are restricted to the first stage of a logical iteration. For example, in FIG. 3, side-effects operations of the first logical iteration 370 are scheduled for stage 5 372 (i.e., for the fifth physical iteration of loop body 300). Load operations of the first logical iteration 370 are scheduled for stage 1 371 (i.e., for the first physical iteration 350 of loop body 300). Arithmetic and logic operations may be scheduled in any of the 5 stages of a logical iteration (NOVL=5 in the illustration of FIG. 3). Arithmetic and logic operations of the first logical iteration 370 are scheduled for any of the stages from stage 1 371 to stage 5 372 (i.e., for any of the first five physical iteration of loop body 300).

Prologue Control

Referring to FIG. 3, the first 4 (i.e., NOVL−1) physical iterations in the prologue portion 330 of loop body 300 include stages having operations collectively shown as garbage operations 310. Loop control logic 400 disables garbage operations of the prologue portion 330 of loop body 300 by de-asserting the ls_se_enbl predicate supplied to STU₀ 433 through STU_m 434. Arithmetic and logic operations are also included in the set of garbage operations 310 and the evaluation of such arithmetic and logic operations at ALU₀ 431 through ALU_k 432 is unaffected by the ls_se_enbl predicate. Since these "garbage" arithmetic and logic operations are not part of any valid logical iteration, they operate on uninitialized data and produce unpredictable "garbage" result values. However, because these garbage result values are used only inside a logical iteration boundary (in the case of loop body code having no recurrent dependencies) and because operations with side-effects are disabled by the ls_se_enbl predicate, the "garbage" result values do not propagate. Handling of "garbage" exception conditions is described below.

Result values that are transferred between logical iterations present a recurrent dependency problem which is managed by the compiler. The compiler provides a register vector for the recurrent variable which is initialized before loop entry and the operation producing the recurrent variable must be executed under control of a prologue predicate such as that used in the Cydra 5. However, only the operation producing the recurrent variable must be predicated.

Referring to FIG. 4, side-effects enabling logic 410 supplies the ls_se_enbl predicate, disabling side-effects operations during the prologue portion of a loop body, and otherwise enabling side-effects operations. Shift register, sh 647, and side-effects enabled flag (seen) 448 allow side-effects enabling logic 410 to distinguish the prologue portion of a loop body. Side-effects enabled flag (seen) 448 acts as a sticky bit representation of bit zero (sh[0]) of shift register, sh 447. A loop initialization operation loads shift register, sh 447 and side-effects enabled flag (seen) 448 as follows:

sh=1<<(novl);

seen=(novl==0);

where novl is the number of overlapped logical iterations minus one (i.e., NOVL−1) which is supplied by the initialization operation. The value novl==0 signifies non-overlapped loop body code. Shift register, sh 447, is right shifted and side-effects enabled flag (seen) 448 is optionally set at the end of each physical iteration, as follows:

next_sh=sh>>1;

if (sh[1])

seen=1;

sh=next_sh;

by update logic 481 and 482. To implement the loop schedule of FIG. 3, shift register, sh 447, is initialized such that sh |4| is set, side-effects enabled flag (seen) 448 is cleared, the loop mode flag, lm 444, is set, and the manual control flag semc 442 is cleared. Side-effects enabling logic 410 disables operations with side-effects during the first four physical iterations, i.e., while side-effects enabled flag (seen) 448 is unset. Then, beginning with the fifth physical iteration, operations with side-effects are enabled and remain enabled for the remainder of the loop body.

Those of ordinary skill in the art will recognize a variety of alternative embodiments of loop control logic 400 which distinguish the prologue portion of a loop body using loop status registers. For example, update logic 481 and 482 may be integral with implementations of shift register, sh 447 and side-effects enabled flag (seen) 448. Furthermore, the embodiment of FIG. 4 provides support for more advanced nested loop control techniques as described in (a) a co-pending patent application entitled "Architectural Support for Software Pipelining of Nested Loops," Ser. No. 08/733,479, naming Babaian et al. as inventors and filed on even date herewith, and (b) the corresponding PCT international application designating the United States of America (Ser. No. PCT/RU96/00216), the detailed descriptions of which are incorporated herein by reference. For loop control of a simple or inner loop body (e.g., that illustrated in FIG. 3), a simpler prologue distinguishing design which eliminates the shift register and sticky bit aspects of the FIG. 4 embodiment is possible.

In one such alternative embodiment (not shown) for control of a simple or inner loop, a prologue counter register (rather than side-effects enabled flag (seen) 448) allows side-effects enabling logic 410 to distinguish the prologue portion of a loop body. A loop initialization operation loads the prologue counter register (illustratively pcnt) with a value equal to novl before entering a loop body, and pcnt is decremented at the end of each physical iteration until pcnt reaches zero. To implement the loop schedule of FIG. 3, pcnt is initialized with the value, 4, the loop mode flag, lm 444, is set, and the manual control flag semc 442 is cleared. Side-effects enabling logic 410 disables operations with side-effects during the first four physical iterations, i.e., while pcnt 443 contains a non-zero value. Then, as before, beginning with the fifth physical iteration, operations with side-effects are enabled and remain enabled for the remainder of the simple or inner loop.

Epilogue Control

The last four (i.e., NOVL−1) physical iterations of loop body 300 (i.e., epilogue portion 340) include stages having operations collectively shown as garbage operations 320. Loop control logic 400 disables these garbage operations of the epilogue portion 340 of loop body 300 by de-asserting the ls_ld_enbl predicate supplied to LDU₀ 435 through LDU_n 436. As before, arithmetic and logic operations are also included in the set of garbage operations 310 and the evaluation of such arithmetic and logic operations at ALU₀ 431 through ALU_k 432 is unaffected by the ls_ld_enbl predicate. Since these "garbage" arithmetic and logic operations are not part of any valid logical iteration, they operate on uninitialized data and produce unpredictable "garbage" result values. However, these garbage result values are used only inside a logical iteration boundary and loop body code compiled in accordance with the constraints described above must restrict operations having side-effects to the last stage of a logical iteration. Since garbage operations 320 includes no operations with side-effects, "garbage" result values do not propagate. Handling of "garbage" exception conditions is described below.

Load enabling logic 420 supplies the ls_ld_enbl predicate, disabling load operations during the epilogue portion of a loop body, and otherwise enabling load operations. The current loop counter register, clc 445, and the epilogue counter register, ecnt 441, allow load enabling logic 420 to distinguish the epilogue portion of a loop body. A loop initialization operation loads clc 445 with an initial loop counter value, lc, equal to the number of logical iterations (8 in the exemplary loop schedule of FIG. 3) and loads ecnt 441 with the value novl. As before, novl is the number of overlapped logical iterations minus one (i.e., NOVL−1) which is supplied by the initialization operation.

The current loop counter register, clc 445, is decremented at the end of each physical iteration until clc 445 reaches zero. The condition clc=1 signals the first stage of last logical iteration (illustratively, logical iteration 8 in FIG. 3).

The condition clc=0 indicates the beginning of the epilogue period, in response to which load enabling logic 420 disables operations of the load class. To implement the loop schedule of FIG. 3, clc 445 is initialized with the value, 8, loop mode flag, lm 444, is set, and manual control flag ldmc 446 is cleared. Load enabling logic 420 enables load operations during the first eight physical iterations, i.e., while clc 445 contains a non-zero value. Then, beginning with the ninth physical iteration, load operations are disabled and remain disabled for the remainder of the loop body. Epilogue counter register ecnt 441 is decremented at the end of each physical iteration of the epilogue until the value in ecnt 441 reaches zero, signaling termination of the loop body.

Exception Handling

Besides the propagation of results, arithmetic and logic which are included in either the garbage operations 310 of prologue period 330 or the garbage operations 320 of epilogue period 340 present an additional challenge, "garbage" exception conditions. Garbage arithmetic and logical operations in the prologue portion 330 of loop body 300 may operate on uninitialized operand values and, as a result, exception conditions may be triggered. Since the garbage arithmetic and logical operations are an artifact of the software pipelining model rather than valid operations, the exception conditions or traps which result are superfluous. The problem can be solved by deferring the handling of an exception until the last stage of a logical iteration, i.e. until the point when it is known whether the iteration (and hence the exception) is superfluous. This approach is implemented using the technique of speculative execution, which is well known to those of ordinary skill in the art, and which is improved in an embodiment of VLIW processor 200 by introduction of diagnostic operand typing. Generally speaking, the speculative execution technique is designed for simultaneous execution of several branches while a condition is being resolved. However, the exception handing problem of a software pipelined loop is similar. Indeed, several logical iterations are overlapped and executed simultaneously while some of them are invalid and their results should be ignored.

The use of speculative execution, in VLIW processor 200 is as follows. Each operand in VLIW processor 200 is tagged with the extra bit, a diagnostic bit (db). Data paths, register files and functional units in processor must all support this feature. When an operation, which is being executed speculatively, issues an exception, it marks its result (for example in register file 230) as a diagnostic value. The actual exception handling event or trap is deferred. The diagnostic value may contain information about the operations and the triggering exception. Variations can be implementation dependent and will be appreciated by those of ordinary skill in the art.

If a subsequent operation, being executed speculatively, uses such value as an input operand, the diagnostic bit tagging is passed through to the result. In this way, the exception propagates along the speculatively executed execution path, while still deferring the exception or trap. If the execution path (i.e., a branch or garbage operations in a loop) will not be taken, all its results and exceptions are extinguished. If, however, the execution path is taken (i.e., if the loop operations are not garbage operations), its results and exception conditions (if any) are eventually passed to operations which are executed non-speculatively. The diagnostic operand causes the db_exception and trap when the input operand is used in a non-speculatively executed operation. As applied to pipelined loops, this approach requires that all operations of a logical iteration, except those having side-effects, be executed speculatively. Operations with side-effects must be executed non-speculatively. In this way, all kinds of side-effects, including exceptions and traps are deferred until the last stage of a logical iteration. Side-effects associated with exceptions and traps are therefore controlled by the loop status registers described above with reference to FIG. 4.

A disadvantage of this approach is the associated additional hardware—an extra bit in all data paths, register files, and execution units. However, the benefits must be measured against alternative schemas for speculative execution. In general, an operation upon execution can be marked with a flag as corresponding to a particular branch and as being executed speculatively. The flag can then be advanced through the CPU pipeline along with the operation. When the branch condition is eventually resolved, operations associated with a branch not taken are invalidated, while those associated with the taken branch become non-speculative. This may occur at any stage of the pipeline. However, the approach results in two limitations. First, the length of the speculative branch is limited by the length of the CPU pipeline; and second, the number of simultaneously executed non-speculative branches is limited by the hardware resources dedicated to implementation of the speculative execution mode. In contrast, the above approach—i.e., an extra bit in all data paths, register files, and execution units—allows an unlimited number of simultaneously executing logical iterations in each physical iteration (i.e., unlimited overlap) and an unlimited length for a speculative branch (i.e., a logical iteration) in terms of operations.

Very Long Instruction Word (VLIW) Processor

Referring back to FIG. 2, a Very Long Instruction Word (VLIW) processor 200 embodiment of the present invention includes a long instruction word architecture and exploits Instruction Level Parallelism (ILP) among operations of a long instruction word. A compiler is used to schedule operations to be executed by VLIW processor 200 during each cycle. The design of VLIW processor 200 allows concurrent execution of multiple independent operations (e.g., load, store, add, multiply, divide, shift, logical, and branch operations) that make up a long instruction. Long instructions are stored in a memory 211 and an instruction cache (IC) 282 of VLIW processor 200 in packed form as sets of 16-and 32-bit syllables. Particular operations can occupy a part of syllable, a whole syllable or several syllables. Operation execution time at execution units 248 is one cycle for integer and logic operations, two cycles for floating point addition, three or four cycles for floating point multiplication, seven cycles for word format division, and ten to eleven cycles for two-word format, normalized operands. All operations except division can be executed in every cycle; division can be run every other cycle.

VLIW processor 200 includes an instruction buffer (IB) 210, a control unit (CU) 220, a multiport register file (RF) 230, 4 arithmetic logic channels (ALC0 241, ALC1 242, ALC2 243, and ALC3 244), each of which includes multiple execution units 248, array access channels (AAC0, AAC1, AAC2, and AAC3) 250, a memory management unit (MMU) 260, a memory access unit (MAU) 270, an array prefetch buffer (APB) 235, and a data cache (DCACHE) 280. The combination of long instructions encoding multiple independent operations and the large number of execution units 150 allows several alternative program branches to execute concurrently in a speculative mode.

Instruction buffer 210 fetches long instructions from memory 211, or from an included instruction cache (IC) 282 if cached. In an exemplary embodiment of VLIW processor 200, instruction buffer 210 includes instruction cache (IC) 282, instruction alignment logic, a program counter register (PC) 216, and control transfer preparation registers (CTPR1 213, CTPR2 214, and CTPR3 215). Instruction cache (IC) 282 is filled in response to both linear program path prefetches and control transfer preparation operations.

Control unit (CU) 220 issues operations from a long instruction to execution units (EUs) 248. In addition, control unit (CU) 220:

1. reads up to ten operands from the register file (RF) 230 for provision to arithmetic logic channels (ALC0 241, ALC1 242, ALC2 243, and ALC3 244);
2. reads up to three predicate values from predicate file (PF) 231 as condition codes for Control Transfer Operations (CTOPs);
3. reads up to eight predicate values from the predicate file (PF) 231 for provision to the calculate condition unit (CCU) 233 for calculation of new predicate values and generation of a condition execution mask for operations at execution units 248 of arithmetic logic channels (ALC0 241, ALC1 242, ALC2 243, and ALC3 244) and for operations in array access channels (AAC0, AAC1, AAC2, and AAC3) 250;
4. issues literal values to arithmetic logic channels (ALC0 241, ALC1 242, ALC2 243, and ALC3 244) and array access channels (AAC0, AAC1, AAC2, and AAC3) 250;
5. issues up to four operations to arithmetic logic channels (ALC0 241, ALC1 242, ALC2 243, and ALC3 244);
6. issues up to four operations to array access channels (AAC0, AAC1, AAC2, and AAC3) 250; and
7. issues up to four operations to calculate condition unit (CCU) 233.

Control unit (CU) 120 also executes Control Transfer Operations (CTOPs) and includes an instruction register (IR) 221, an unpacked instruction register, scattering logic, and special registers 224. The special registers 224 include:

1. loop parameter and status registers 640 (e.g., LPR, LSHR1, LSHR2, and LSHR3) used for loop control and
2. base registers for addressing into predicate file 231 for control transfers and conditional (predicated execution) mode.

Both the loop parameter and status registers and the base registers are software accessible for read and write. The design and operation of instruction register 221, the unpacked instruction register, and scattering logic are described in greater detail in (a) a co-pending patent application entitled "Wide Instruction Unpack," Ser. No. 08/733,832, naming Sakhin et al. as inventors and filed on even date herewith, and (b) the corresponding PCT international application designating the United States of America (Ser. No. PCT/RU96/00218), the detailed descriptions of which are incorporated herein by reference.

Predicate file (PF) 231 includes storage for predicate values generated by integer and floating point compare operations. Predicate values are used to control the conditional (or predicated) execution of operations. In the exemplary embodiment of FIG. 2, predicate file (PF) 231 includes 32 two-bit registers. Calculate condition unit (CCU) 233 generates a mask for conditional execution of operations at execution units 248 of arithmetic logic channels (ALC0 241, ALC1 242, ALC2 243, and ALC3 244) and for operations in array access channels (AAC0, AAC1, AAC2, and AAC3) 250.

In the exemplary embodiment of FIG. 2, register file 230 includes 18-port memory that enables each of 4 execution units to read 2 arguments (or 3 arguments in the case of store operations), to write 4 results (one from each ALU) and to write 4 values read from memory in each cycle. Register file 230 includes 256 66-bit registers, that are accessed with 4 bases (CWP, CWPAR, BR1, BR2) defined in special registers 224 of control unit 220. Each base allows the addressing of up to 64 registers from register file 230. Like the Cydra 5, VLIW processor 200 provides register addressing which is relative to a base register. The loop base registers, BR1 and BR2, allow decrementing and cycling to provide a rotating set of physical registers from register file 230 to represent vector elements in software pipelined inner loops. In this way, a compiler can allocate a consecutive set of registers which is only as long as the lifetime of a vector element.

Execution units of VLIW processor 200 are combined in 4 pipelined ALU channels (ALC0 241, ALC1 242, ALC2 243, and ALC3 244). Each ALU channel has 2 data multiplexers MUX0 and MUX1, unpack circuits, and 2 input registers (Data Reg0 and Data Reg1 ). The design and operation of execution units and ALU channels of VLIW processor 200 are described in greater detail in (a) a co-pending patent application entitled "Multifunctional Execution Unit, Executing Combined Operations and Supporting Continuing Instruction Flow," Ser. No. 08/733,834, naming Gorshtein et al. as inventors and filed on even date herewith, and (b) the corresponding PCT international application designating the United States of America (Ser. No. PCT/RU96/002 14), the detailed descriptions of which are incorporated herein by reference.

In the embodiment of FIG. 2, individual ALU channels differ in the set of execution units implemented and operations supported. For example, ALC0 241 includes execution units for executing integer arithmetic, division, and floating point addition operations. ALC1 242 includes execution units for executing memory access operations, integer operations and floating point addition operations. ALC2 243 includes execution units for executing integer, logic and shift operations, as well as floating point addition and multiplication operations. Finally, ALC3 244 includes execution units for executing integer and logic operations, floating point multiplication operations, and memory access operations.

The assignment of operation sets to ALCs is driven by a desire to provide even ALU channel loading for integer as well as floating-point computations. However, alternate execution unit configurations would also be suitable, including larger or smaller numbers of ALCs, alternate mappings of operations to ALCs, and segregated integer and floating point execution unit configurations. Indeed alternative embodiments need not group execution units in ALCs. Suitable designs for such alternate configurations will be appreciated by those of ordinary skill in the art. Execution unit and ALC configurations are of any such suitable designs.

Besides the memory access execution units of ALC1 and ALC3, memory access is also possible via array access channels (AAC0, AAC1, AAC2, and AAC3) 250. During loop execution, array access units (AAUs) of the array access channels 250 issue addresses for the loading (and storing) of array elements from (and to) main memory to (and from) register file 230. In the exemplary embodiment of FIG. 2, each of 4 independent array access channels 250 (i.e., AAC0–AAC3) corresponds to a DTLB 237 port. Each array access channel includes 8 pairs of address registers, which include a current address register (CAR) and an increment register (INCR). For memory accesses, one pair of address registers is used in every cycle. For operations in a loop (e.g., loads and stores of array elements with a constant step through the array) the current address from the CAR register is delivered to the memory and is modified by an increment from the INCR register. In the exemplary embodiment of FIG. 2, AAC0 and AAC2 are used for load memory accesses, and AAC1 and AAC3 are used for both load and store memory accesses.

Array prefetch buffer (APB) 235 is used to prefetch array elements for loops from memory. In the exemplary embodiment of FIG. 2, array prefetch buffer (APB) 235 includes a four-channel FIFO buffer. Each channel includes forty-eight (48) 66-bit registers. Data are transferred from array prefetch buffer (APB) 235 to register file (RF) 230 when the data are ready. Suitable array prefetch buffer designs (such as for array prefetch buffer (APB) 235) and suitable array access unit designs (such as for array access channels (AAC0, AAC1, AAC2, and AAC3) 250) are described in greater detail in (a) a co-pending patent application entitled "Array Prefetch Algorithm," Ser. No. 08/733,831, naming Babaian et al. as inventors and filed on even date herewith, and (b) the corresponding PCT international application designating the United States of America (Ser. No. PCT/RU96/00217), the detailed descriptions of which are incorporated herein by reference.

Memory management Unit (MMU) 260 includes a four-port Data Translation Lookaside Buffer (DTLB) 237 with 64 entries and hardware for searching in a page table in the case of a DTLB 237 miss. Memory management unit (MMU) 260 also contains disambiguation memory 294 for checking rearrangement correctness of load and store operations, performed by an optimizing compiler.

Memory access unit (MAU) 270 provides an interface for communicating between VLIW processor 200 and memory 211 at an exchange rate of up to four information words transferred per cycle. Memory access unit (MAU) 270 includes an entry buffer for memory requests and a crossbar of five memory access channels (i.e., four data access channels and one instruction access channel for instruction fetches from instruction buffer 210) to four physical memory channels. In the exemplary embodiment of FIG. 2, the two least significant bits of a physical address correspond to physical memory channel number each memory access channel includes a 64-bit data path.

Data cache (DCACHE) 280 caches data for scalar memory accesses and, in the exemplary embodiment of FIG. 2, is organized as a write-through, 32 Kbyte, four-way set associative with 64-byte blocks, although alternative organizations are also suitable.

Additional Embodiments

While the invention has been described with reference to various embodiments, it will be understood that these embodiments are illustrative and that the scope of the invention is not limited to them. Many variations, modifications, additions, and improvements of the embodiments described are possible. For example, the implementation of loop control logic is merely illustrative. Alternative embodiments may incorporate other structures and/or methods for recognizing the prologue and epilogue portions of a loop body. Alternative embodiments may also incorporate other structures and/or methods and for inhibiting the operation of side-effects operations during the prologue and of load operations during the epilogue. Furthermore, alternative processor embodiments may define analogous sets of operation classes in accordance with the operation semantics implemented by a particular processor architecture without departing from the spirit and scope of the invention.

Additionally, structures and functionality presented as hardware in the exemplary embodiment may be implemented as software, firmware, or microcode in alternative embodiments. These and other variations, modifications, additions, and improvements may fall within the scope of the invention as defined in the claims which follow.

What is claimed is:

1. An apparatus comprising:
   a prologue distinguishing register complex responsive to physical iterations of loop body code, wherein the state of the prologue distinguishing register complex advances toward an end of prologue state in correspondence with the physical iterations of the loop body code;

an epilogue distinguishing register responsive to the physical iterations of the loop body code, wherein the state of the epilogue distinguishing register advances toward a beginning of epilogue state in correspondence with the physical iterations of the loop body code;

side-effects enabling logic coupled to the prologue distinguishing register complex and responsive to the state thereof, wherein the side-effects enabling logic supplies a side-effects enabled predicate except during a prologue period of the loop body; and loads enabling logic coupled to the epilogue distinguishing register and responsive to the state thereof, wherein the loads enabling logic supplies a loads enabled predicate except during an epilogue period of the loop body.

2. An apparatus, as recited in claim 1, wherein the prologue distinguishing register complex comprises:
   an N-bit shift register wherein an indication at a first particular one of the N bits corresponds to the end of prologue state and wherein the state of the N-bit shift register is advanced by shifting.

3. An apparatus, as recited in claim 2,
   wherein the prologue distinguishing register complex further includes a side-effects enabled flag coupled to the N-bit shift register, wherein the side-effects enabled flag comprises a sticky-bit representation of the first particular one of the N bits of the shift register; and
   wherein the side-effects enabling logic is coupled to the side-effects enabled flag and responsive to the state thereof, wherein the side-effects enabling logic supplies the side-effects enabled predicate in response to an indication at the side-effects enabled flag.

4. An apparatus, as recited in claim 1,
   wherein the prologue distinguishing register complex comprises a prologue counter field, wherein a count value thereof corresponds to the end of prologue state, and wherein the state prologue counter is advanced by counting in accordance with a preselected count direction; and
   wherein the side-effects enabling logic is coupled to the prologue counter field and responsive to the state thereof, wherein the side-effects enabling logic supplies the side-effects enabled predicate in response to the count value.

5. An apparatus, as recited in claim 3, further comprising:
   an initialization operation in code for execution prior to the loop body code, wherein the initialization operation sets an Mth bit of the N-bit shift register, M being equal to a number of overlapped logical iterations minus one (1) in the loop body code, and wherein the initialization operation initializes the epilogue distinguishing register with an indication corresponding to a number of logical iterations in the loop body code.

6. An apparatus, as recited in claim 4, further comprising: an initialization operation in code for execution prior to the loop body code, wherein the initialization operation initializes the prologue counter with an initialization value equal to a number of overlapped logical iterations minus one (1) in the loop body code, and wherein the initialization operation initializes the epilogue distinguishing register with an indication corresponding to a number of logical iterations in the loop body code.

7. An apparatus, as recited in claim 1, further comprising:
a first execution unit coupled to the side-effects enabling logic, wherein the first execution unit executes a first-type operation from the loop body code when the side-effects enabled predicate is supplied and inhibits execution of the first-type operation from the loop body code otherwise; and
a second execution unit coupled to the loads enabling logic, wherein the second execution unit executes a second-type operation from the loop body code when the loads enabled predicate is supplied and inhibits execution of the second-type operation from the loop body code otherwise.

8. An apparatus, as recited in claim 7,
wherein the first-type operation is an operation that causes side-effects; and
wherein the second-type operation is a load operation.

9. An apparatus, as recited in claim 8, further comprising
a third execution unit for executing a third-type operation from the loop body code, wherein the third operation is not an operation that causes side-effects and not a load operation, and wherein the third execution unit is unaffected by the side-effects enabled predicate and the loads enabled predicate.

10. An apparatus, as recited in claim 9, further comprising a memory coupled to the first and second execution units as an operand source for the load operation and as a result destination for a store operation.

11. The apparatus of claim 1 in a loop control unit of a pipelined processor.

12. The apparatus of claim 1 in a loop control unit of a Very Long Instruction Word (VLIW) processor.

13. An apparatus, as recited in claim 1, wherein the loop body code comprises software pipelined loop body code corresponding to a simple loop.

14. An apparatus, as recited in claim 1, wherein the loop body code comprises software pipelined loop body code corresponding to an innermost loop nested within one or more levels of outer loops.

15. A method of controlling execution of software pipelined loop body code, the method comprising the steps of:
initializing a prologue distinguishing register complex with an indication corresponding to a number of overlapped logical iterations minus one (NOVL−1) in the loop body code;
initializing an epilogue distinguishing register with an indication corresponding to a number of logical iterations in the loop body code;
advancing the state of the prologue distinguishing register complex toward an end of prologue state in correspondence with physical iterations of the loop body code;
advancing the state of the epilogue distinguishing register toward a beginning of epilogue state in correspondence with physical iterations of the loop body code;

after the prologue distinguishing register complex reaches the end of prologue state, supplying a side-effects enabled predicate to a first execution unit providing execution support for operations of the loop body code that cause side-effects; and
until the epilogue distinguishing register reaches the beginning of epilogue state, supplying a loads enabled predicate to a second execution unit providing execution support for load operations of the loop body code.

16. The method of claim 15, wherein the prologue distinguishing register complex state advancing step includes:
shifting an N-bit shift register;
setting a sticky-bit side-effects enabled flag in correspondence with shifting an indication into a particular one of the N bits of the shift register corresponding to the end of prologue state; and
supplying the side-effects enabled predicate based on the state of the sticky-bit side-effects enabled flag.

17. The method of claim 15, wherein the prologue distinguishing register complex state advancing step includes:
advancing a counter in accordance with a preselected count direction; and
supplying the side-effects enabled predicate based on a value of the counter corresponding to the end of prologue state.

18. The method of claim 15, further comprising the steps of:
executing a first operation of a physical iteration of the loop body code at the first execution unit in accordance with the side-effects enabled predicate and otherwise inhibiting execution of the first operation;
executing a second operation of a physical iteration of the loop body code at the second execution unit in accordance with the loads enabled predicate and otherwise inhibiting execution of the second operation;
executing a third operation of a physical iteration of the loop body code at a third execution unit without regard to the side-effects enabled predicate or the loads enabled predicate.

19. A method for providing a computer system apparatus, the method comprising the steps of:
providing a prologue distinguishing register complex responsive to physical iterations of loop body code, wherein the state of the prologue distinguishing register complex advances toward an end of prologue state in correspondence with the physical iterations of the loop body code;
providing an epilogue distinguishing register responsive to the physical iterations of the loop body code, wherein the state of the epilogue distinguishing register advances toward a beginning of epilogue state in correspondence with the physical iterations of the loop body code;
providing side-effects enabling logic coupled to the prologue distinguishing register complex and responsive to the state thereof, wherein the side-effects enabling logic supplies a side-effects enabled predicate except during a prologue period of the loop body; and
providing loads enabling logic coupled to the epilogue distinguishing register and responsive to the state thereof, wherein the loads enabling logic supplies a loads enabled predicate except during an epilogue period of the loop body.

* * * * *